(12) United States Patent
Funk et al.

(10) Patent No.: US 10,114,661 B2
(45) Date of Patent: Oct. 30, 2018

(54) SYSTEM AND METHOD FOR FAST STARTING AN APPLICATION

(71) Applicant: ROKU, INC., Saratoga, CA (US)

(72) Inventors: Jim Funk, Los Altos, CA (US); Craig Johnson, San Jose, CA (US); David Mendenhall, Los Altos, CA (US)

(73) Assignee: ROKU, INC., Los Gatos, CA (US)

( * ) Notice: Subject to any disclaimer, the term of this patent is extended or adjusted under 35 U.S.C. 154(b) by 281 days.

(21) Appl. No.: 14/536,481

(22) Filed: Nov. 7, 2014

(65) Prior Publication Data

US 2016/0132344 A1     May 12, 2016

(51) Int. Cl.
| | |
|---|---|
| G06F 9/54 | (2006.01) |
| G06F 9/445 | (2018.01) |
| G06F 9/4401 | (2018.01) |
| G06F 9/48 | (2006.01) |
| H04L 29/06 | (2006.01) |

(52) U.S. Cl.
CPC ........ *G06F 9/44578* (2013.01); *G06F 9/4418* (2013.01); *G06F 9/485* (2013.01); *G06F 9/541* (2013.01); *H04L 65/00* (2013.01)

(58) Field of Classification Search
None
See application file for complete search history.

(56) References Cited

U.S. PATENT DOCUMENTS

| | | | | |
|---|---|---|---|---|
| 5,563,648 A | * | 10/1996 | Menand ............. | H04N 7/17318 348/E7.071 |
| 6,098,158 A | | 8/2000 | Lay et al. | |
| 2005/0071617 A1 | * | 3/2005 | Zimmer ................ | G06F 9/4401 713/1 |
| 2006/0288011 A1 | * | 12/2006 | Gandhi ............... | G06F 17/3089 |
| 2007/0083743 A1 | | 4/2007 | Tsang | |
| 2007/0208759 A1 | * | 9/2007 | von Koch ........... | G06F 17/3089 |
| 2007/0244980 A1 | * | 10/2007 | Baker, III ............ | G06Q 10/107 709/207 |
| 2009/0049550 A1 | * | 2/2009 | Shevchenko ........... | G06F 21/56 726/23 |
| 2011/0022984 A1 | * | 1/2011 | van der Meulen ......................... | G06F 9/44526 715/830 |
| 2011/0113229 A1 | * | 5/2011 | Itoh ....................... | G06F 9/4418 713/2 |

(Continued)

OTHER PUBLICATIONS

International Search Report and Written Opinion of the International Searching Authority for International Application No. PCT/US2015/058894, dated Feb. 17, 2016.

*Primary Examiner* — Shih-Wei Kraft
(74) *Attorney, Agent, or Firm* — Sterne, Kessler, Goldstein & Fox P.L.L.C.

(57) ABSTRACT

One or more applications are started in suspend mode during a boot up sequence of the operating system. The one or more applications are added to a suspended list. The system continues by monitoring a plurality of application programming interface (API) calls made from the application layer to one or more graphic rendering modules; and processing the plurality of API calls to the one or more graphic rendering modules based on whether each API call belongs to an application on the suspended list. Fast starting a channel application can also be done in a predictive manner via the search function or based on feeds in a notification area.

20 Claims, 14 Drawing Sheets

(56) References Cited

U.S. PATENT DOCUMENTS

| | | | |
|---|---|---|---|
| 2012/0167122 A1* | 6/2012 | Koskimies | G06F 9/5027 |
| | | | 719/328 |
| 2012/0254901 A1 | 10/2012 | Shinoda et al. | |
| 2012/0260118 A1* | 10/2012 | Jiang | G06F 9/4843 |
| | | | 713/340 |
| 2013/0036299 A1* | 2/2013 | Itoh | G06F 9/4401 |
| | | | 713/2 |
| 2013/0047149 A1 | 2/2013 | Xu et al. | |
| 2013/0212603 A1 | 8/2013 | Cooke et al. | |
| 2014/0372356 A1* | 12/2014 | Bilal | G06N 5/02 |
| | | | 706/46 |
| 2015/0095838 A1* | 4/2015 | Rossi | G06F 3/0483 |
| | | | 715/777 |

\* cited by examiner

SYSTEM AND METHOD FOR FAST STARTING AN APPLICATION

FIELD

Various embodiments of the invention relate to systems and methods for fast starting an application within an operating system.

BACKGROUND

Today's operating systems are very versatile and allow many applications to operate concurrently in the background. The number of applications that can be operated at the same time within an operating system is usually limited by the hardware's memory and processing power. Although memory size and processing power have greatly increased over the years, the number of resource intensive applications has also increased dramatically.

In a smart television example, the user may install video on demand (VOD) applications for various television/cable channels such as ABC®, CBS®, NBC®, HBO®, TLC®, Discovery®, ESPN®, etc. The user may decide to run many of the applications at the same time in order to facilitate fast switching between those applications. However, when many applications are concurrently operated, the television's resources will be taxed and eventually slow down to a point where the user's experience will be greatly diminished. Accordingly, what is needed is a system to will enable fast switching between applications or fast start up of applications on a consumer device without diminishing the user's experience.

SUMMARY OF THE INVENTION

A method/system for fast starting one or more channel applications is disclosed herein. The method includes: starting one or more applications in suspend mode during a boot up sequence of the operating system; adding the one or more applications to a suspended list; monitoring a plurality of application programming interface (API) calls made from the application layer to one or more graphic rendering modules; and processing the plurality of API calls to the one or more graphic rendering modules based on whether each API call belongs to an application on the suspended list. The one or more applications started in suspend mode during a boot up sequence of the operating system may be the most frequently used applications.

In one aspect, an API call to the one or more graphic rendering modules is blocked if the API call belongs to an application on the suspended list. Each time an API call is blocked, a block count is incremented. Once an application reaches a certain block count, the application may be terminated. In this way, misbehaved applications are terminated to prevent waste of memory and processing resources.

Fast starting channel applications can also be done in a predictive manner. In one aspect, the method comprises: receiving a command to view a list of channels; and removing one or more of the most used channel applications from the suspended list in response to the command to view the list of channels. In other words, once the user selects "My channels" (or a channel menu option) the system would immediately remove two or more of the most frequently used channel applications from the suspended list. This basically enables those channel applications to make API calls to graphic rendering modules again and to start quickly once the user selects one of the channel applications. Following on this concept, the method further comprises: sending a resume instruction to a first channel application from one or more of the most used channel applications; and switching the first channel application to a foreground application in response to receiving a user command to run the first channel application.

Once the user selects a channel application, the remaining non-selected channel applications are added back to the suspended list. Accordingly, the method further comprises: re-adding the removed one or more of the most used channel applications to the suspended list in response to receiving a command to activate/run another channel application.

The method also teaches starting the one or more applications in background mode prior to placing the one or more applications in suspend mode. Additionally, a predetermined time period may be required before causing an application running in background mode to switch to suspend mode.

Fast starting a channel application can also be done in a predictive manner via the search function. In one aspect, the method comprises: receiving a search term from a user; determining one or more relevant channels based on the search term; determining whether the one or more relevant channels are on the suspended list; if the one or more relevant channels are on the suspended list, removing the one or more relevant channels from the suspended list; and if the one or more relevant channels are not on the suspended list, starting the one or more relevant channels in the suspend mode of the operating system.

The method may also consider the user subscription status to determine which channel applications to start in background and/or suspend mode. Accordingly, the method further comprises: determining whether the user has subscription to the one or more relevant channels; and starting only the one or more relevant channels to which the user has subscription in background and/or suspend mode.

Fast starting a channel application can also be done at the notification screen and/or news feeds. In one aspect, the method further comprises: displaying a plurality of feeds on a notification area of a display screen; determining one or more channel applications relevant to the plurality of feeds; determining whether the one or more relevant channel applications are on the suspended list; if the one or more relevant channel applications are on the suspended list, removing the one or more relevant channel applications from the suspended list; and if the one or more relevant channel applications are not on the suspended list, starting the one or more relevant channel applications in the suspend mode of the operating system.

Once a feed rolls off the notification area as newer feeds are displayed, the relevant channel application for the rolled off feed may be terminated, assuming the channel application is running in the background or in suspend mode.

In yet another embodiment, a non-transitory processor-readable medium is provided. The medium has one or more instructions operational on a client device, which when executed by a processor causes the processor to: start one or more applications in suspend mode during a boot up sequence of the operating system; add one or more application identifiers to a suspended list, wherein each application identifier uniquely identifies each of the one or more applications; monitor a plurality of application programming interface (API) calls made from the application layer to one or more graphic rendering modules; and process the plurality of API calls to the one or more graphic rendering modules based on whether each API call belongs to an application on the suspended list.

In yet another embodiment, a system for streaming television content comprises: a user device having a memory that retains a set of instructions to: start one or more applications in suspend mode during a boot up sequence of the operating system; add one or more application identifiers to a suspended list, wherein each application identifier uniquely identifies each of the one or more applications; monitor a plurality of application programming interface (API) calls made from the application layer to one or more graphic rendering modules; process the plurality of API calls to the one or more graphic rendering modules based on whether each API call belongs to an application on the suspended list; and a processor, at the user device, that executes the set of instructions.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

DETAILED DESCRIPTION

In the following description numerous specific details are set forth in order to provide a thorough understanding of the invention. However, one skilled in the art would recognize that the invention might be practiced without these specific details. In other instances, well known methods, procedures, and/or components have not been described in detail so as not to unnecessarily obscure aspects of the invention.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

Overview

Today, more and more people are eliminating their cable and satellite services altogether to go with streaming solutions such as the Roku streaming player. The streaming option is attractive to many people for a variety of reasons including it being a cheaper alternative to cable/satellite television and the instant accessibility to thousands of programs across many different streaming platforms and providers such as Roku® channels, Netflix®, HBO GO®, and M-GO. Additionally, the required investment on hardware is minimal and sometime even free as the streaming software application is preloaded onto many devices.

Figure 1:
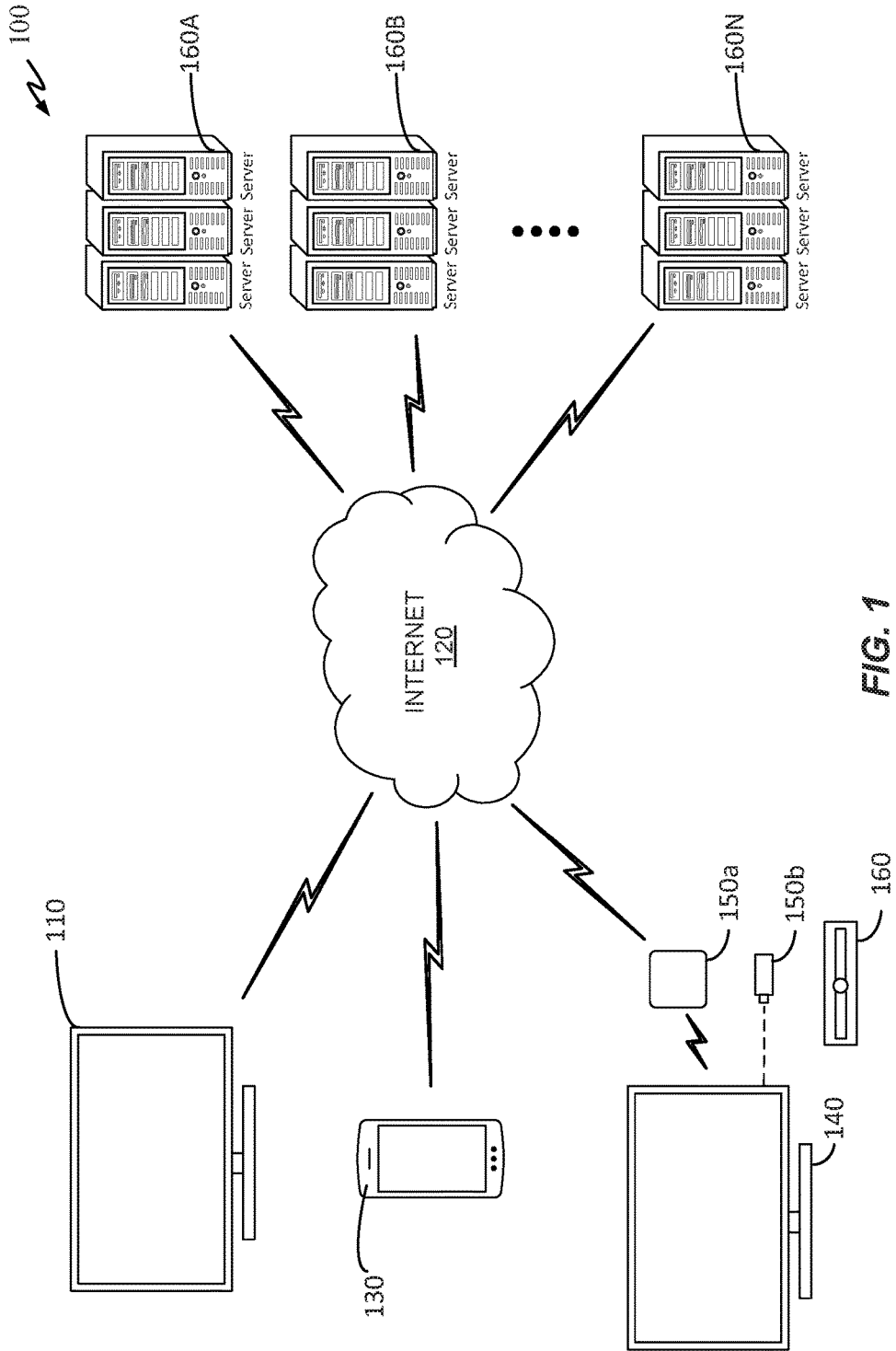
FIG. 1 illustrates an exemplary streaming environment.

FIG. 1 illustrates an exemplary streaming environment 100 common to most streaming systems. As shown in FIG. 1, environment 100 includes a television 110 such as a LED flat screen TV, the Internet 120, a user device 130 such as a mobile phone or tablet, a display device 140, streaming client devices 150a-b, and a plurality of servers 160A-160N. Television 110 may be an Internet enabled smart TV having preloaded streaming applications such as the Roku streaming application or Roku TV. For example, TCL® and Hisense® brands televisions include Roku TV right out of the box, thus enabling users to immediately stream programs from a selection of more than 1000+ channels straight to their televisions without the need to purchase any additional hardware or software. Once the streaming application (e.g., Roku TV) is executed, it communicates with one or more content servers 160a-160n via Internet 120 to request and receive streaming program/content for display on television 110.

User device 130 may be a smartphone, a tablet, or any other suitable mobile device with the ability to access the Internet or broadband wireless such as 4G LTE, 5G, or any other suitable wireless communication standard. User device 130 may include a streaming application such as Roku mobile App (not shown) to enable it to stream contents from one or more servers 160a-n via the Internet to user device 130, television 110, or display device 140.

Streaming contents may also be delivered to a display device such as display device 140 using a streaming player 150a or streaming stick 150b. Each of streaming player 150a and streaming stick 150b is connected to an audio/video input (e.g., HDMI, MHL) of display device 140. In this set up, all of the software applications needed for streaming and video decoding reside on streaming player 150a or streaming stick 150b. An exemplary streaming player 150a is the Roku 3, and an exemplary streaming stick 150b is the Roku Streaming Stick.

Environment 100 may also include a traditional cable or satellite set-top-box (STB) 160 configured to stream multimedia from the Internet. This is often referred to as over the top (OTT) content delivery because the main mode of content delivery for STB 160 is accomplished via cable or satellite. Most STBs allow users to download and install $3^{rd}$ party applications such as Pandora®, sports guide, fantasy football league, etc. Certain STBs also allow users to run them concurrently. However, starting up a new application or switching between running applications, in traditional STBs/consumer devices, is very slow and cumbersome.

Fast Starting an Application

An improved method and system for fast starting an application is described herein. At the boot of a device's operating system, one or more applications may be started in background mode after the operating system finishes booting all of its key drivers and resources. Applications started at boot time are then placed into suspend mode after an initial time has passed. This allows the started applications time to finish the boot process, load necessary resources, and perform updates, etc. Once an application is in suspend mode, the system adds the application onto a suspended list, which is a list that keep tracks of all applications going in and out of suspend mode. The suspended list is also used as the gate keeper of API calls to graphic modules or any other modules that is resource intensive (i.e., require a lot of processing power from the central processing unit (CPU) or the graphic processing unit (GPU)).

A resource or API handler may be configured to process all API calls made to graphic modules (e.g., library components of graphic rendering engine) based on whether each API call belongs to an application on the suspended list. If an API call belongs to an application on the suspended list, the API handler may terminate or ignore the API call. Conversely, if the API call belongs to an application not on the suspended list, then the handler will process the API call normally. In this way, all suspended applications remain truly suspended until each of the application is authorized to come out of suspend mode. Fast starting an application may comprise first removing the application from the suspended list and then sending a resume instruction to the application. Additionally, the application may also be made into the main foreground application once the user selects or activates the application.

Figure 2:
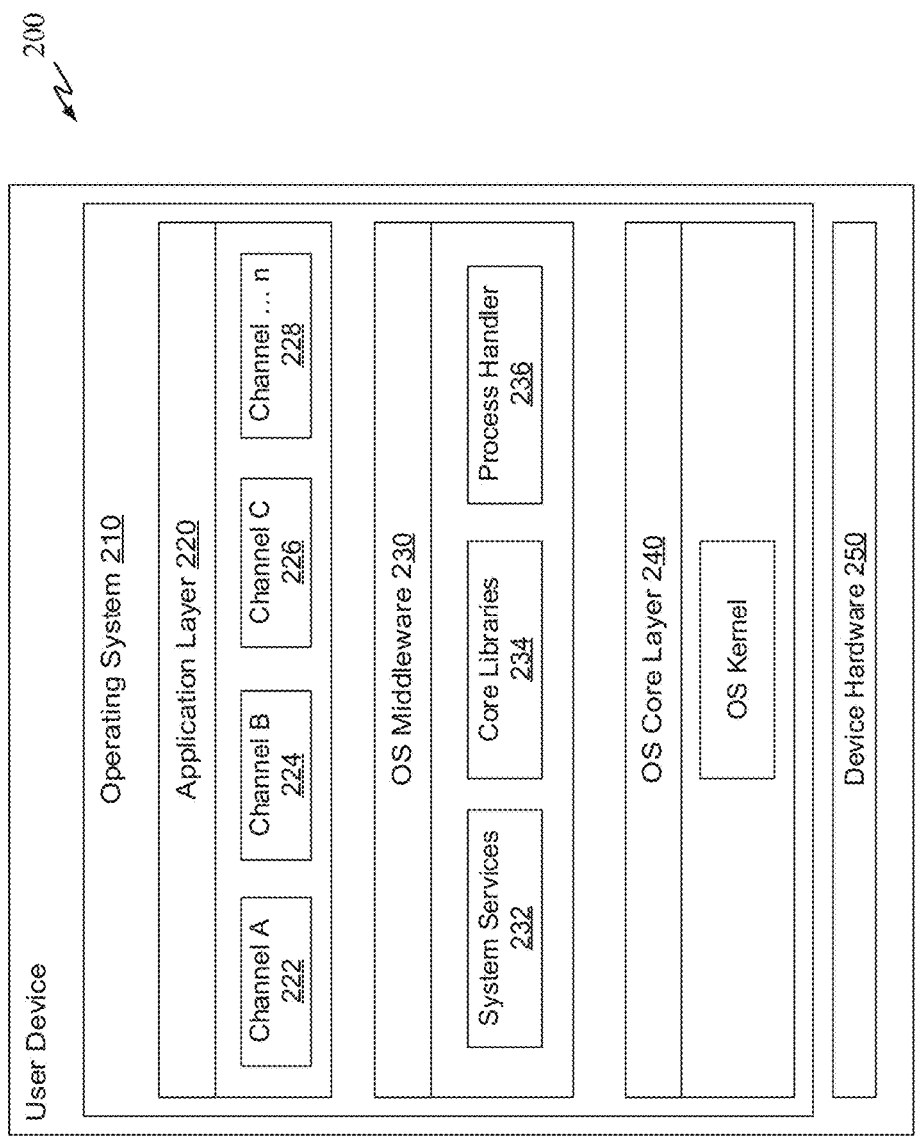
FIGS. 2-3 illustrate exemplary operating systems in accordance to one or more aspects of the disclosure.

FIG. 2 illustrates a user device 200 that can be configured to implement various aspects of the disclosure. User device 200 includes a multi-layered operating system 210. The top most layer of operating system 210 is an application layer 220. A middleware layer 230 sits below the application layer 200. Middleware layer 230 itself may also contain several layers such as a thin application framework layer and a runtime layer. As shown, middleware layer 230 includes system services 232, core libraries 234, and a process handler 236. A hardware layer 250 of user device 200 sits below core layer 240.

The multilayered architecture is to provide proper isolation of each application in application layer 220. Application isolation is typically achieved by assigning each running application to a virtual operating environment or machine where all running processes are confined within the assigned virtual machine. This process is also referred to as sandboxing. The sandboxing process protects the application's processes and data by preventing another concurrently running application from accessing the application's data and processes.

Figure 3:
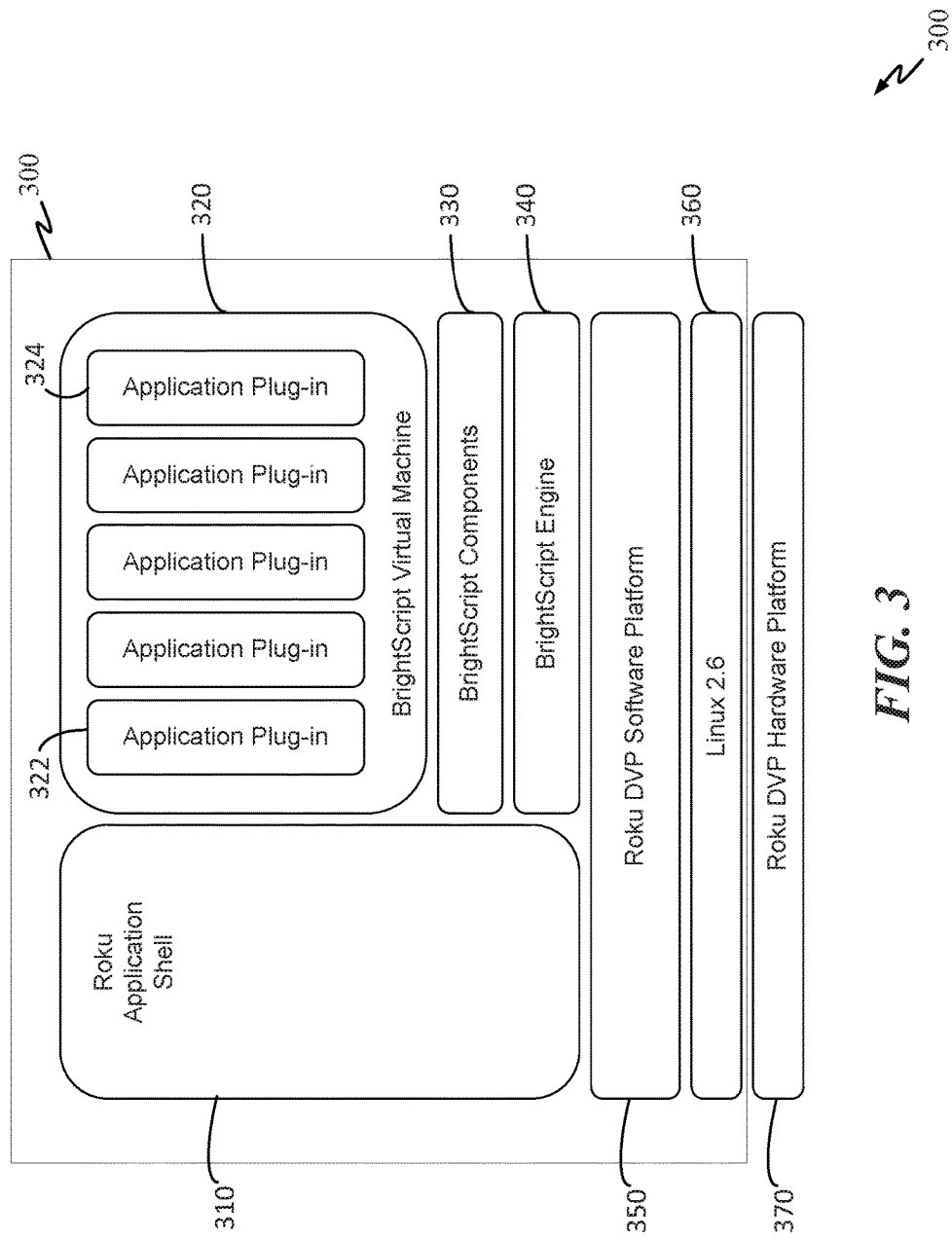

It should be noted that most major operating systems such as Windows®, iOS®, Linux®, and Android® have a similar multi-layered architecture and any one of those systems may be modified to operate in a similar fashion to operating system 200. FIG. 3 illustrates an exemplary Linux® based operating system 300 in which aspects of the disclosure can be implemented. Operating system 300 may reside on streaming client devices 150a-150b and television 110, for example. Operating system 300 includes an application shell 310, an application layer 320, a BrightScript components module 330, a BrightScript engine module 340, a software platform layer 350, and a kernel layer 360. Kernel layer 360 sits directly on top of a hardware layer 370 to manage and interact with various hardware components such as memory, device drivers, security, networking services, etc.

BrightScript component module 330 and engine module 340 may be part of the framework and runtime layer of operating system 300. Application shell 310 may reside on multiple layers such as application layer 320, the framework layer, and the runtime layer. In one aspect, application shell 310 serves as a translation layer for communication between applications, libraries components, and system resources at the kernel layer.

Application layer 320 is where 3$^{rd}$ party channel applications reside such as channel applications 322 and 324. At runtime, each channel application is assigned its own virtual machine, which operates as an independent operating system running within host operating system 300. For example, application channel 322 operates within its own virtual machine that is independent and separate from channel application 324, which also operates within the confine of its own virtual machine. The virtual machine is configured to run any application plug-in (or channel application) as if it is operating on top of its own physical machine. Since a channel application is required to run within the boundary of its own virtual machine, the processes and data of the channel application are protected from other concurrently running channel applications. Data cannot be shared between channel applications unless express permission is granted by the user.

In one aspect, when operating system 300 boots up, applications 322 and 324 automatically start in background mode. A background mode may be an operating mode where the application is operating in the background of the operating system and does not display any user interface or graphics upon start up.

Once an application is started in background mode, it stays in background mode until it is instructed to come out of it. The application may also automatically enters a suspend mode after a certain time. The time delay between running in background mode and the entry of suspend mode is necessary to allow the application to finish loading the necessary resources and updates.

Upon entry of the suspend mode, the application is added to a suspended list. In one aspect, process handler 236 (or a resource manager in layer 340 and/or 350) monitors all API calls to a graphic rendering module. It should be noted that graphic rendering module may include video decoder modules, text/graphic rendering modules, and video playback module. In one aspect, process handler 236 examines each API call to retrieve the process identifier and/or and application identifier to determine the originating application that made the API call. Next, process handler 236 checks whether the originating application is on the suspended list. If yes, process handler 236 may ignore or terminate the API call. If not, process handler 236 may process the API call normally.

Figure 4:
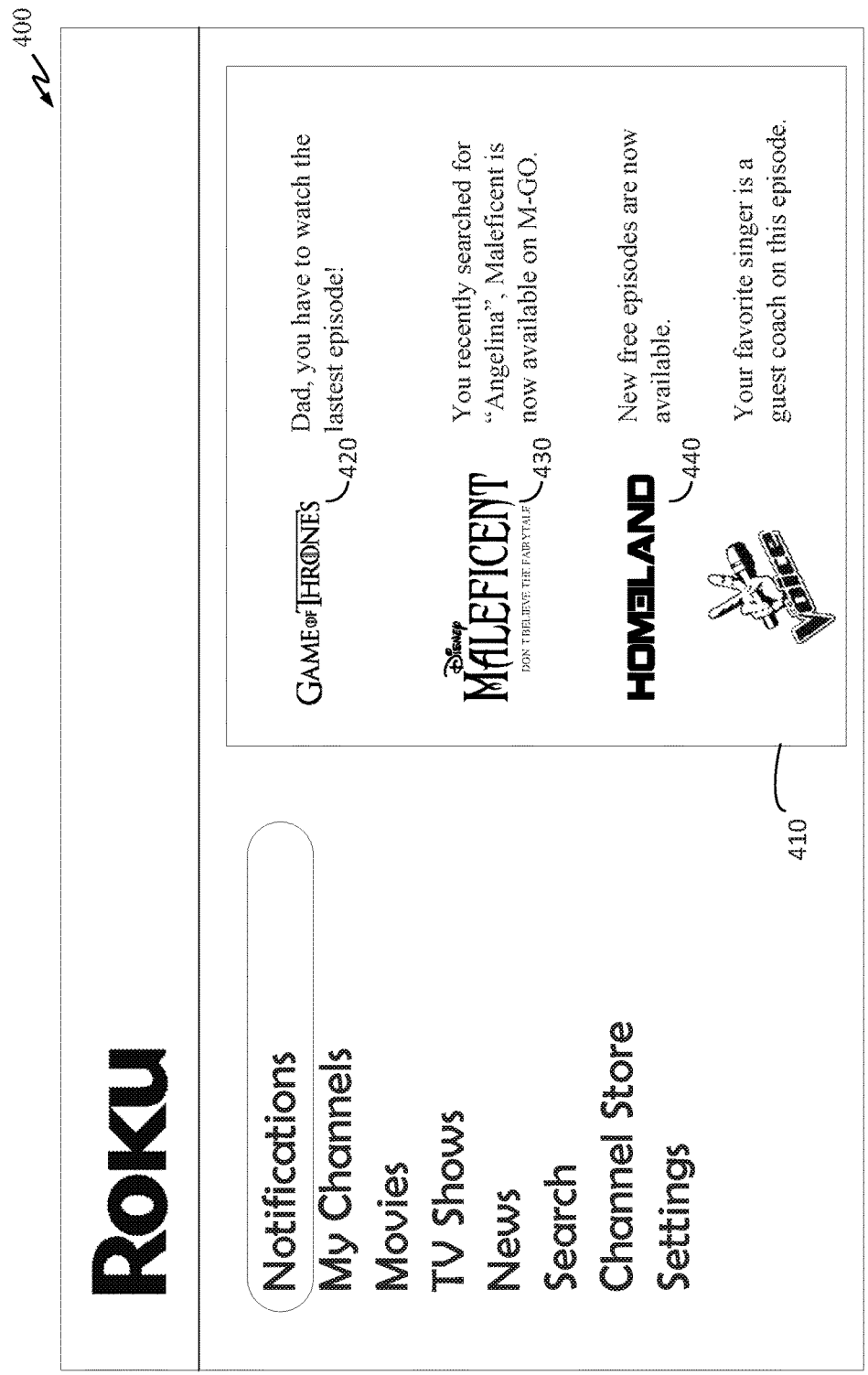
FIGS. 4-5 illustrate exemplary user interfaces of systems and method for searching for multimedia content in accordance to one or more aspects of the disclosure.
Figure 5:
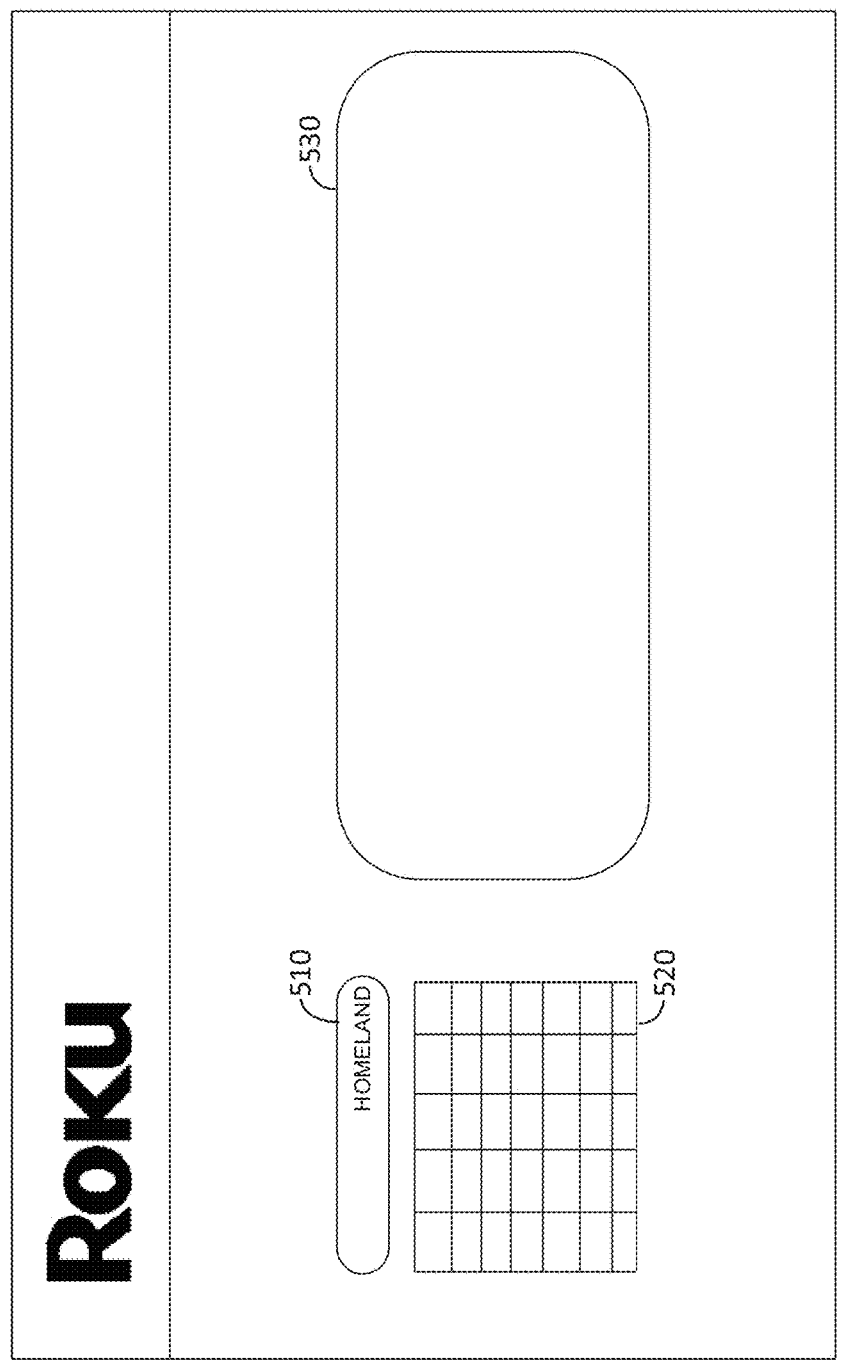

FIGS. 4-5 illustrate exemplary user interfaces (UIs) 400 and 500 in which aspects of the disclosure can be implemented. Notification UI 400 includes a notification area 410 with notification items 420, 430, and 440. Notification UI 400 may be accessed via the home button on the user's remote control or by selecting the notifications option from a menu. Notification area 410 is an area where feeds are displayed. The feeds are continuously updated and are processed in a first-in-first-out (FIFO) manner. Accordingly, as new feeds come in, older feeds are rolled off and deleted. Alternatively, all feeds from a certain date range are recycled and continuously roll in and out of notification area 410.

Each feed item of notification area 410 may be deep linked and relate to a content. For example, item 420 contains deep linking data to a certain episode of Game of Thrones that was suggested or tagged by the user's son. In one aspect of the disclosure, a relevant channel determination module (not shown) analyzes each of the feed items in notification area 410 to determine whether a channel relating to the feed item is available. For example, for item 420, the relevant channel determination module may determine that the relevant channel application is HBO GO. For item 440, the relevant channel application is Showtime Anytime.

Once the relevant channel for each of the feed items is determined, the system determines whether each respective relevant channel is on the suspended list. For example, for items 420 and 440, the system determines whether HBO GO®, and Showtime Anytime® are on the suspended list, respectively. If yes, the system does nothing and awaits user input. In this scenario, yes means that HBO GO® and Showtime Anytime® are both already running in background or suspend mode and can be quickly resumed once the user selects item 420 or 440 to play.

Alternatively, the system may instruct the HBO GO® and Showtime Anytime® applications to switch to background mode. In this way, when the user selects item 440 (Homeland), the application Showtime Anytime® can be quickly rendered because it is already running in the background or from a suspended mode. Even if the Showtime Anytime® is reactivated from suspend mode to active mode, this process is still much faster than a cold boot of the Showtime Anytime® application.

If the system determines one or more relevant channels are not in the suspended list, the system may start the one or more applications in the background automatically, without requiring the user to select any of the feed items. In one aspect, this is done immediately after notification UI 400 is opened. For example, if HBO GO® (item 420) is not on the suspended list, the system would immediately start the channel application for HBO GO® in background mode. In this way, when the user chooses to play item 420, the HBO GO® application can be immediately recalled and thereby improve the user's experience.

In one aspect, the system may instruct one of the more relevant channels in background mode to go in suspend mode, and then add the one or more relevant channels to the suspended list. As mentioned, resuming a suspended channel application from the suspend mode is still much faster than a cold boot.

Referring now to FIG. 5, search UI 500 includes a search input area 510, a keypad area 520, and a results display area 530. In one aspect, the system analyzes the search term in input area 510 to determine the relevant channel for the search term. For example, the search term may be "Homeland." Since there may be only one relevant television show that matches the "Homeland" search term, and that show is only available on Showtime®, the system will identify Showtime Anytime® as the relevant channel. Once the relevant channel is identified, the system checks to determine whether Showtime Anytime® is on the suspended list (which means the channel application is already in a suspended state). If no, the system may start the Showtime Anytime® channel application in background mode to anticipate the user selecting the channel. If the Showtime Anytime® channel is already in suspend mode, the system waits for the user to select the Homeland show and then resumes the Showtime Anytime® application from suspend mode.

Figure 6:
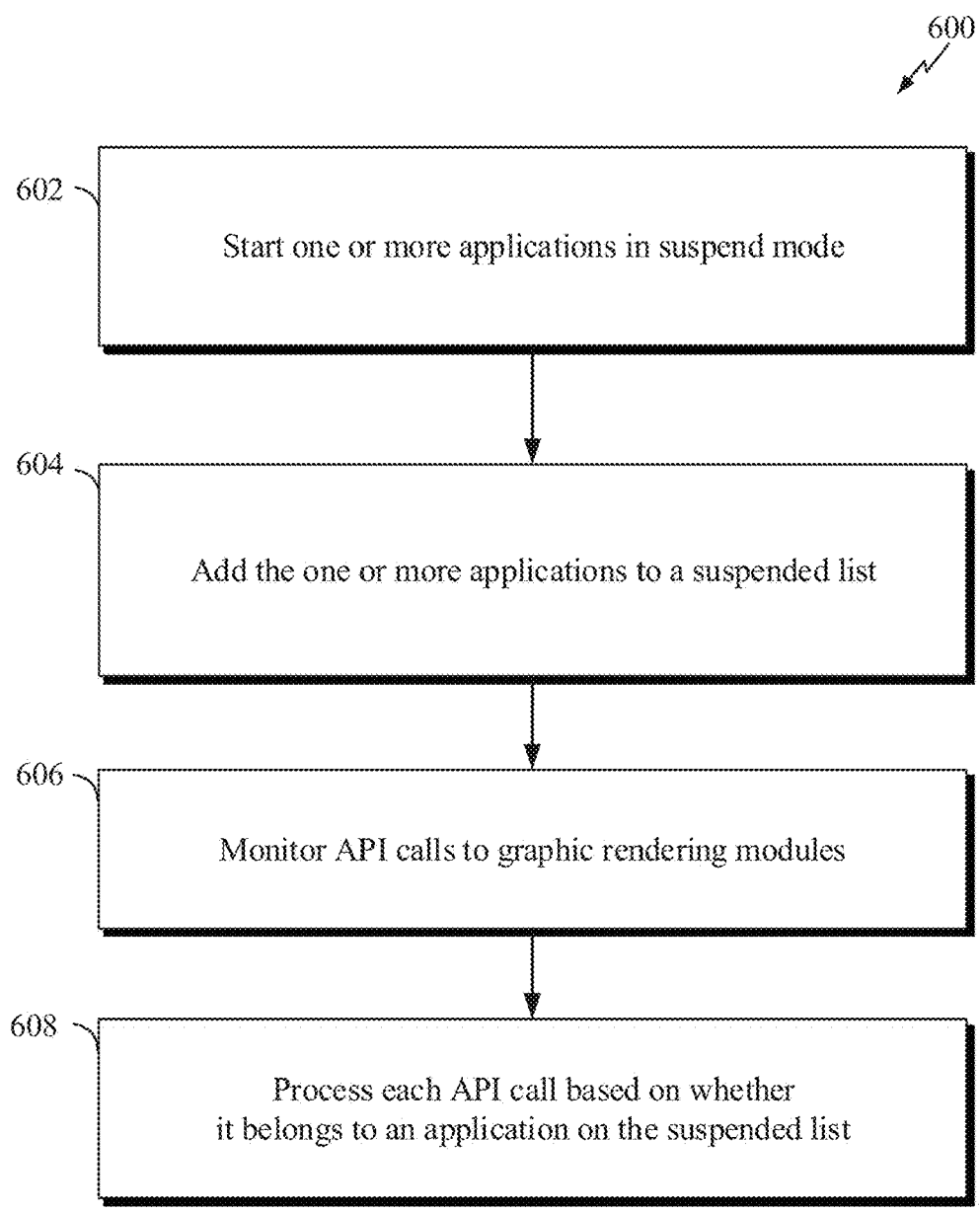
FIGS. 6-12 illustrate exemplary user interfaces of systems for fast starting channel applications in accordance to one or more aspects of the disclosure.

FIG. 6 illustrates an exemplary process 600 for fast starting a channel application in accordance to an aspect of the disclosure. Process 600 starts at 602 where one or more applications are started in suspend mode. Alternatively, the one or more applications are first started in background mode and subsequently placed into suspend mode after a predetermined period of time. This allows the applications to load proper resources and/or perform necessary updates before going into suspend mode. At 604, the one or more applications being suspended are added to the suspended list. In one aspect, an application identifier for each of the suspended applications is determined. The system would then add application identifier to the suspended list. It should be noted that the application identifier may be the same as the name of the channel application.

At 606, API calls to graphic rendering modules are monitored. At 608, each API call is processed based on whether the originating application (the application that made the respective API call) is on the suspended list. The options are 1) ignore or terminate the API call if the originating application is on the suspended list; or 2) process the API call normally if the originating application is not on the suspended list.

Figure 7:
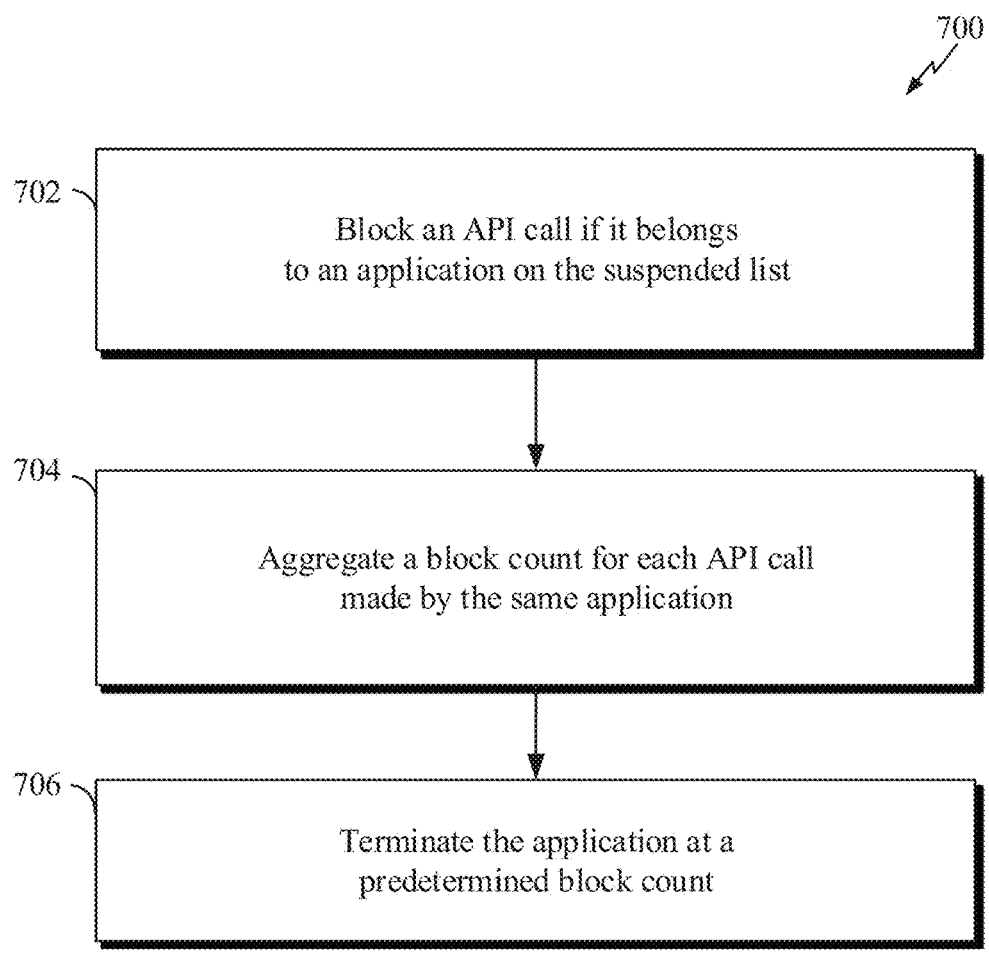

FIG. 7 illustrates an exemplary process 700 for fast starting a channel application in accordance to an aspect of the disclosure. Process 700 may include one or more steps of process 600, which may be executed in any order. In one aspect, process 700 follows process block 608 and continues at 702 where an API call from a channel application on the suspended list is blocked. In this way, the system can ensure that applications in suspend mode remain in suspend mode until they are authorized to exit suspend mode, and to prevent suspended applications from scheduling resource intensive tasks or any task relating to rendering graphics and/or text on the user's display screen. For example, an application in suspend mode may inadvertently execute its screensaver function after a period of inactivity. If this occurs, the API call for the graphic rendering function would be ignored or terminated.

At 704, a block count is aggregated each time an API call is made by an application on the suspended list. Each application has its own aggregated block count. At 706, once the aggregated count reaches a certain level, the application is terminated. In this way, disruptive applications are terminated to prevent waste of memory and processing resources.

Figure 8:
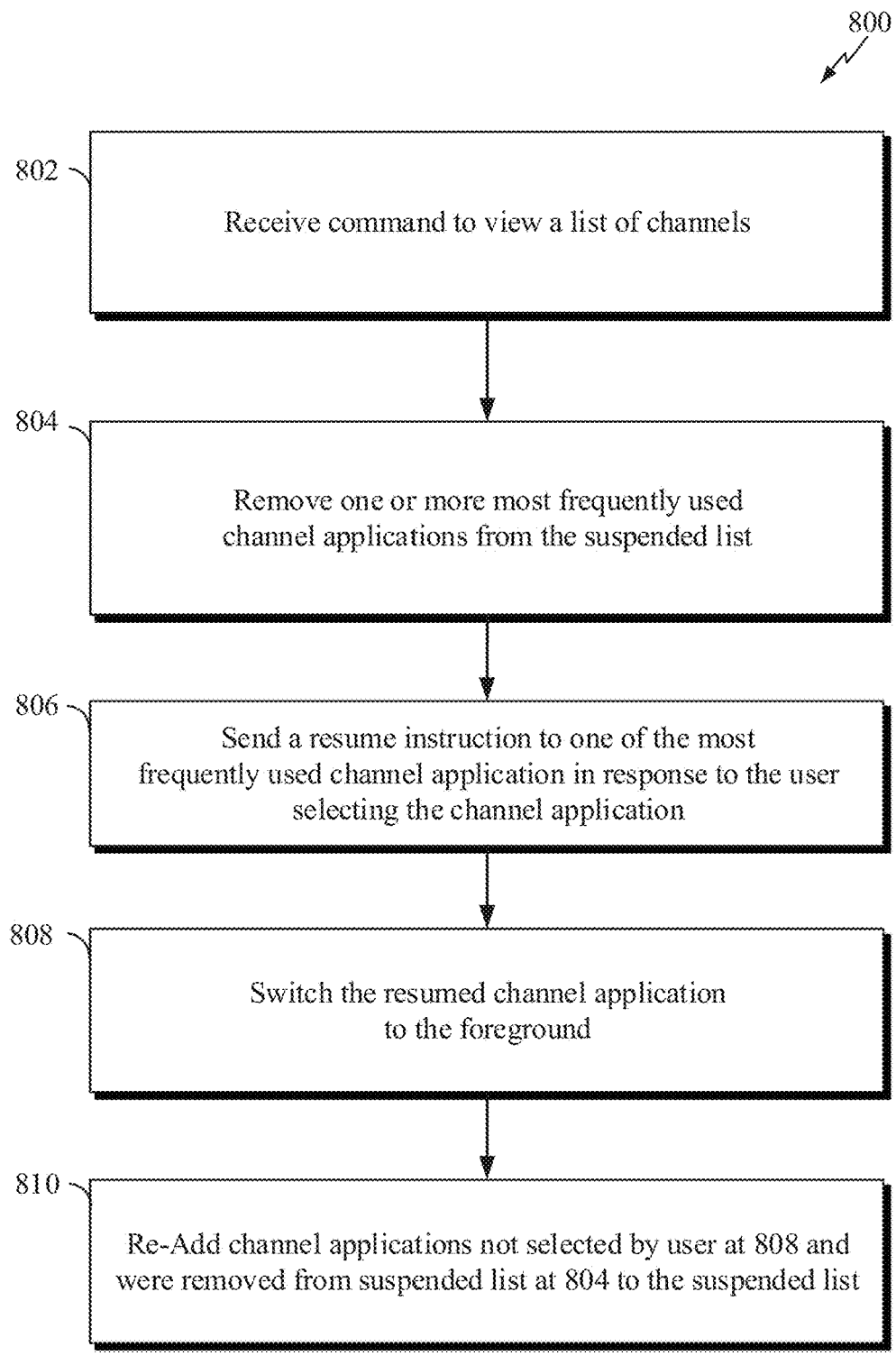

FIG. 8 illustrates an exemplary process 800 for fast starting a channel application in accordance to an aspect of the disclosure. Process 800 begins at 802 where a command to view a list of channels is received from the user. An example command to view a list of channels is the "My Channels" option shown in FIG. 4. Once the "My Channels" menu option is selected, a list of channel applications is displayed to the user. The list may be graphically displayed as panels. At 804, one or more of the most frequently used channel applications (e.g., Netflix®, HBO GO®) are removed from the suspended list. In this way, the removed application can resume normal operation and make API calls to graphic rendering modules or other resource intensive tasks.

At 806, a resume instruction is sent to one of the most frequently used channel applications in response to the user selecting the channel application. At 808, the selected channel is switched to the foreground of the user's display. At 810, channel applications that were removed from the suspended list (at 804) and were not selected by the user (at 806) are placed back onto the suspended list.

Figure 9:
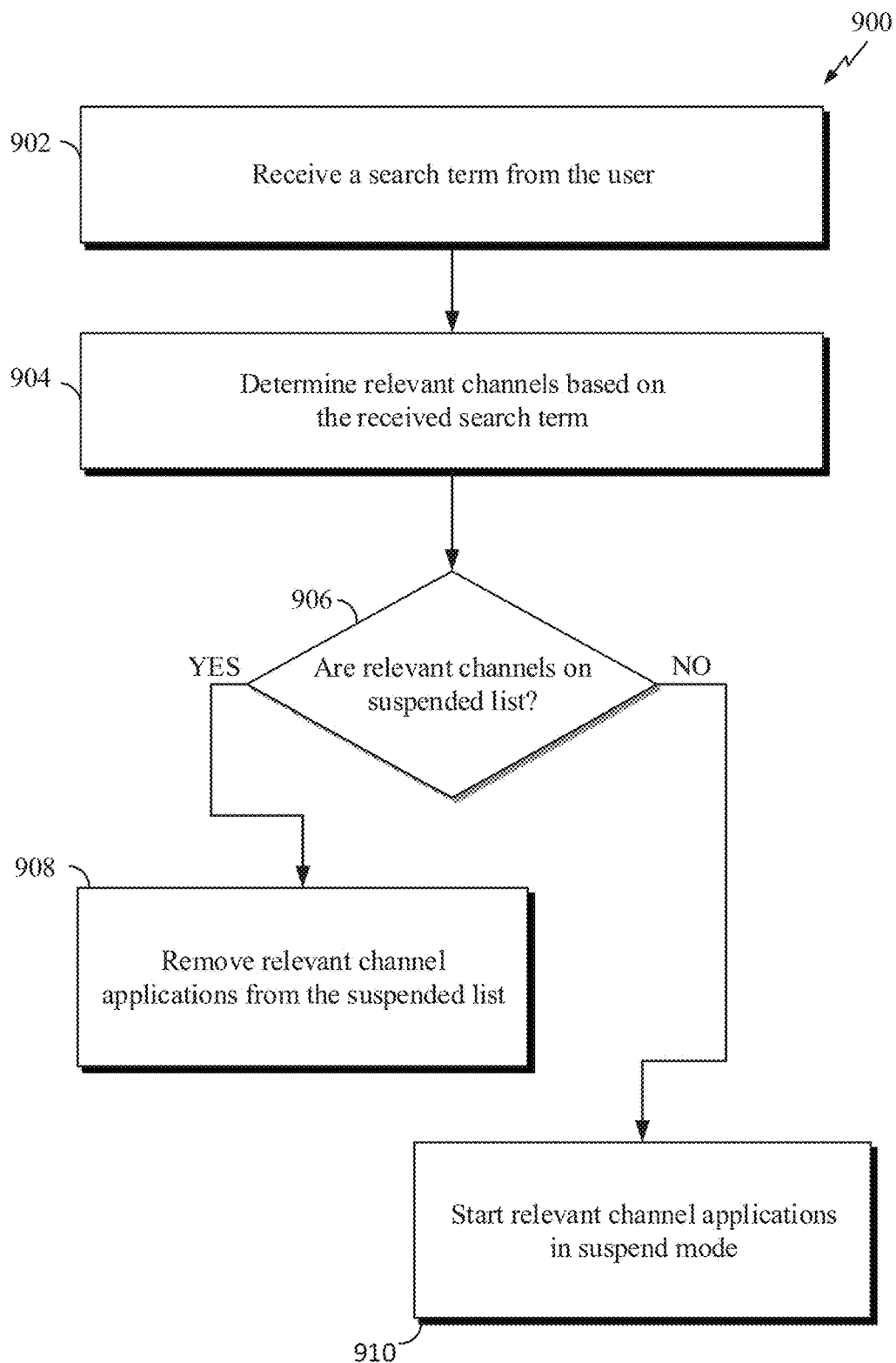

FIG. 9 illustrates an exemplary process 900 for fast starting a channel application in accordance to an aspect of the disclosure. Process 900 starts at 902 where a search term is received from the user. The search term may be entered into the system by the user using UI 500, for example. At 904, channels relevant to the search term are determined. For example, if the search term is "game of thrones," the relevant channel is HBO GO®. Depending on the search term, there may be more than one relevant channel. At 906, a determination is made on whether the relevant channel is on the suspended list. If yes, the relevant channel is removed from the suspended list at 908. In the game of thrones example, HBO GO® is removed from the suspended list if it is on the list. If the answer is no at 906, then the relevant channel may be started in background mode at 910. In one aspect, the relevant channel could be started in suspend mode. In this way, if the user would like to watch Game of Thrones, the HBO GO® application can be quickly started since it is already running in the background or in suspend mode.

Figure 10:
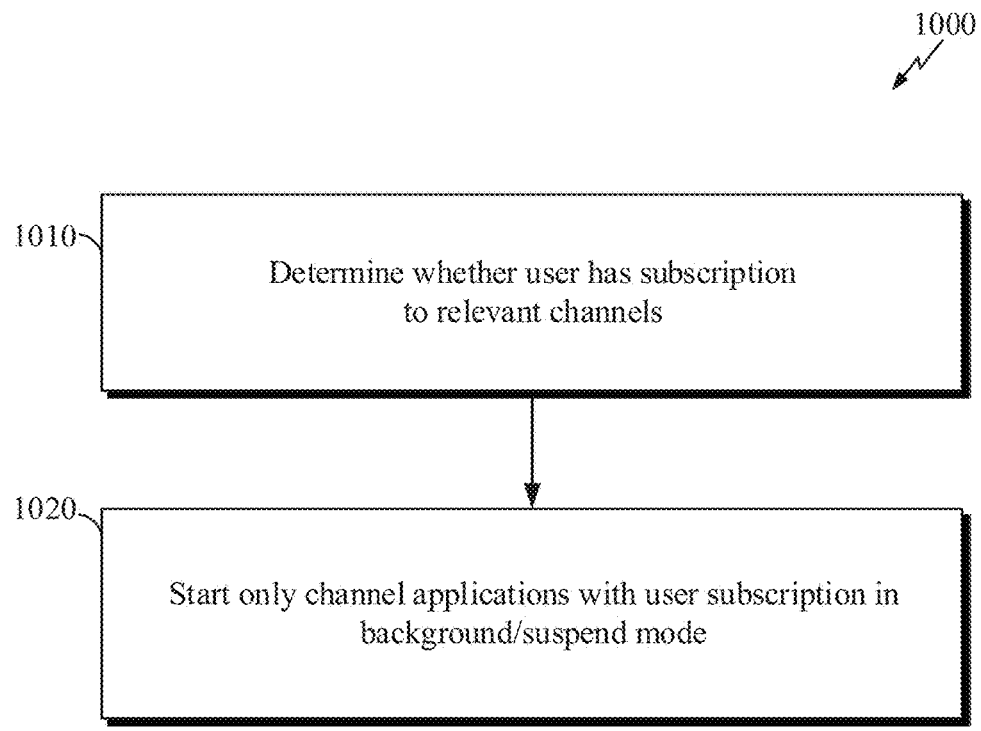

FIG. 10 illustrates an exemplary process 1000 for fast starting a channel application in accordance to an aspect of the disclosure. Process 1000 may include one or more steps of process 900, which may be executed in any order. In one aspect, process 1000 follows process block 910 and continues at 1010 where it is determined whether the user has subscription to the relevant channel. At 1020, only channel to which the user has subscription is started in background or suspend mode. Anecdotal evidence suggests that users are less likely to select a channel application where they have no subscription.

Figure 11:
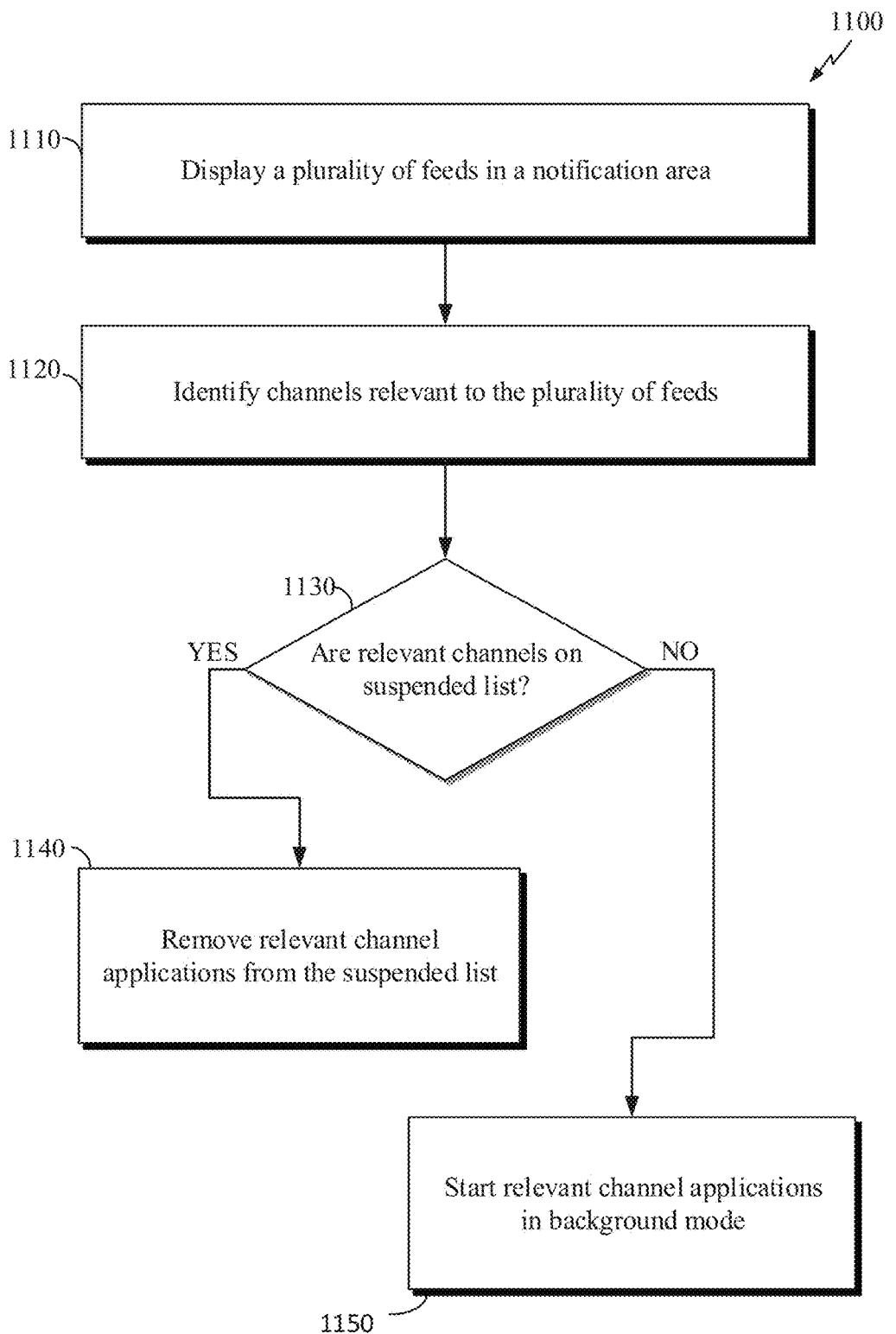

FIG. 11 illustrates an exemplary process 1100 for fast starting one or more channel applications in accordance to an aspect of the disclosure. Process 1100 starts at 1110 where a plurality of feeds are displayed in a notification area such as notification area 410. Examples of feeds are feed items 420, 430, and 440 of FIG. 4. At 1120, channels relevant to the plurality of feeds are identified. For example (referring to FIG. 4), the relevant channel for item 420 is HBO GO®, and the relevant channel for item 440 is Showtime Anytime. At 1130, a determination is made whether any of the identified relevant channels are on the suspended list. If a channel application is on the suspended list, it means that the channel application is already in suspend mode. If the answer is "Yes", the relevant channel application (or applications) is removed from the suspended list at 1140. In this way the relevant channel may be resumed at a moment's notice. If the answer is "No", process 1100 moves to process block 1150 where the identified relevant channel application is started in background mode. In this way, when the user select item 440, for example, the Showtime Anytime app can be started immediately and faster than a cold boot. Alternatively, the identified relevant channel application may be started in suspend mode or placed into suspend mode after a period of time in background mode.

Figure 12:
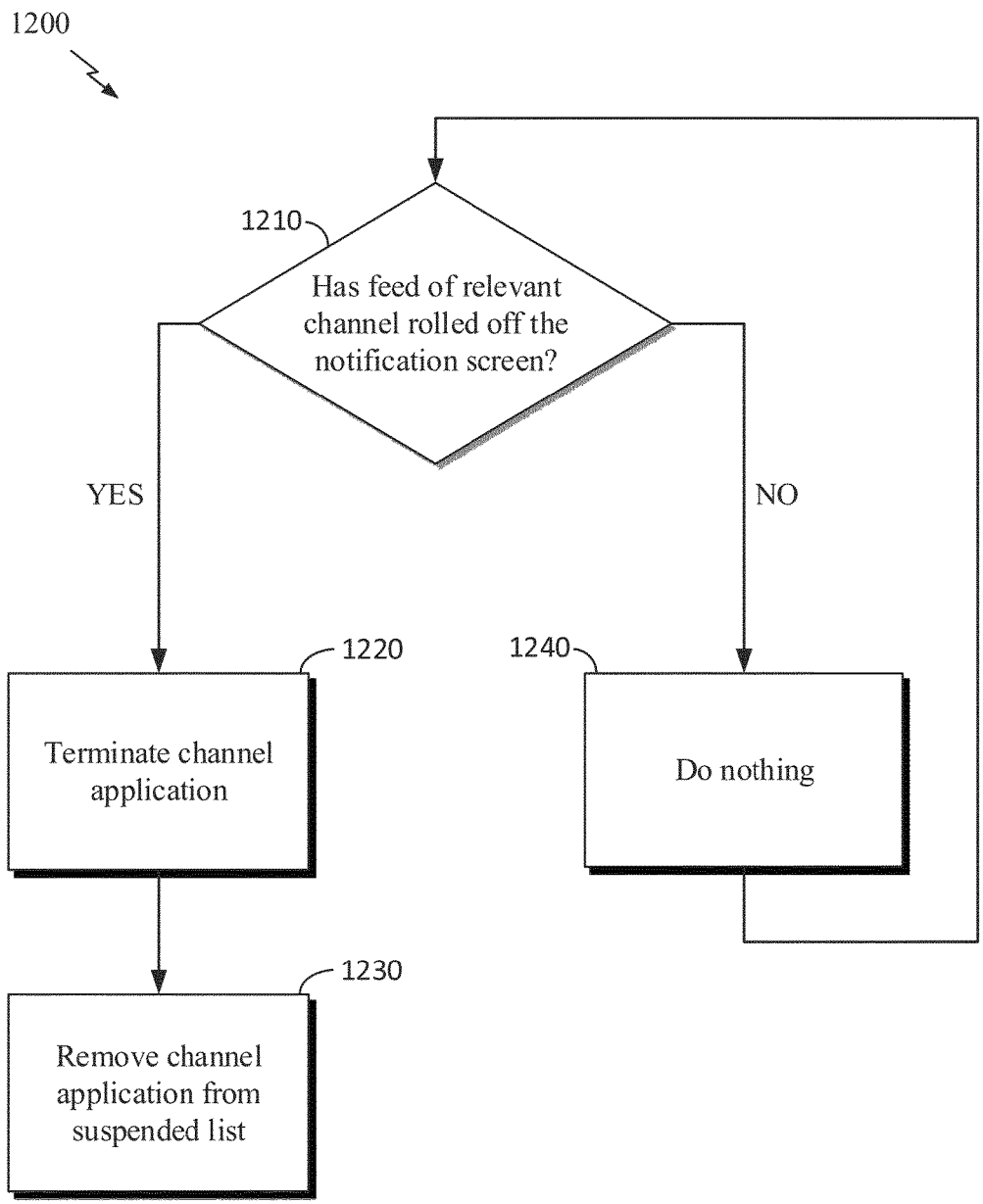

FIG. 12 illustrates an exemplary process 1200 for fast starting a channel application in accordance to an aspect of the disclosure. Process 1200 may include one or more steps of process 1100, which may be executed in any order. In one aspect, process 1200 follows process blocks 1140 and 1150, and continues at 1210 where a determination is made whether a feed of a relevant channel has rolled off the notification screen. It should be noted that the plurality of feeds on the notification may be cycled over a period time in a first-in-first-out manner. In this way, the notification screen is continuously refreshed with new and/or recycled feed items.

If the answer is "YES", the channel application associated with the feed item that is no longer on the notification screen is terminated at 1220. At 1230, the channel application is removed from the suspended list since it is no longer operating in the background or suspend mode. If the answer is "NO", process 1200 does nothing (at 1240) and continues to monitor each feed item at 1210.

Exemplary Hardware Implementation

Figure 13:
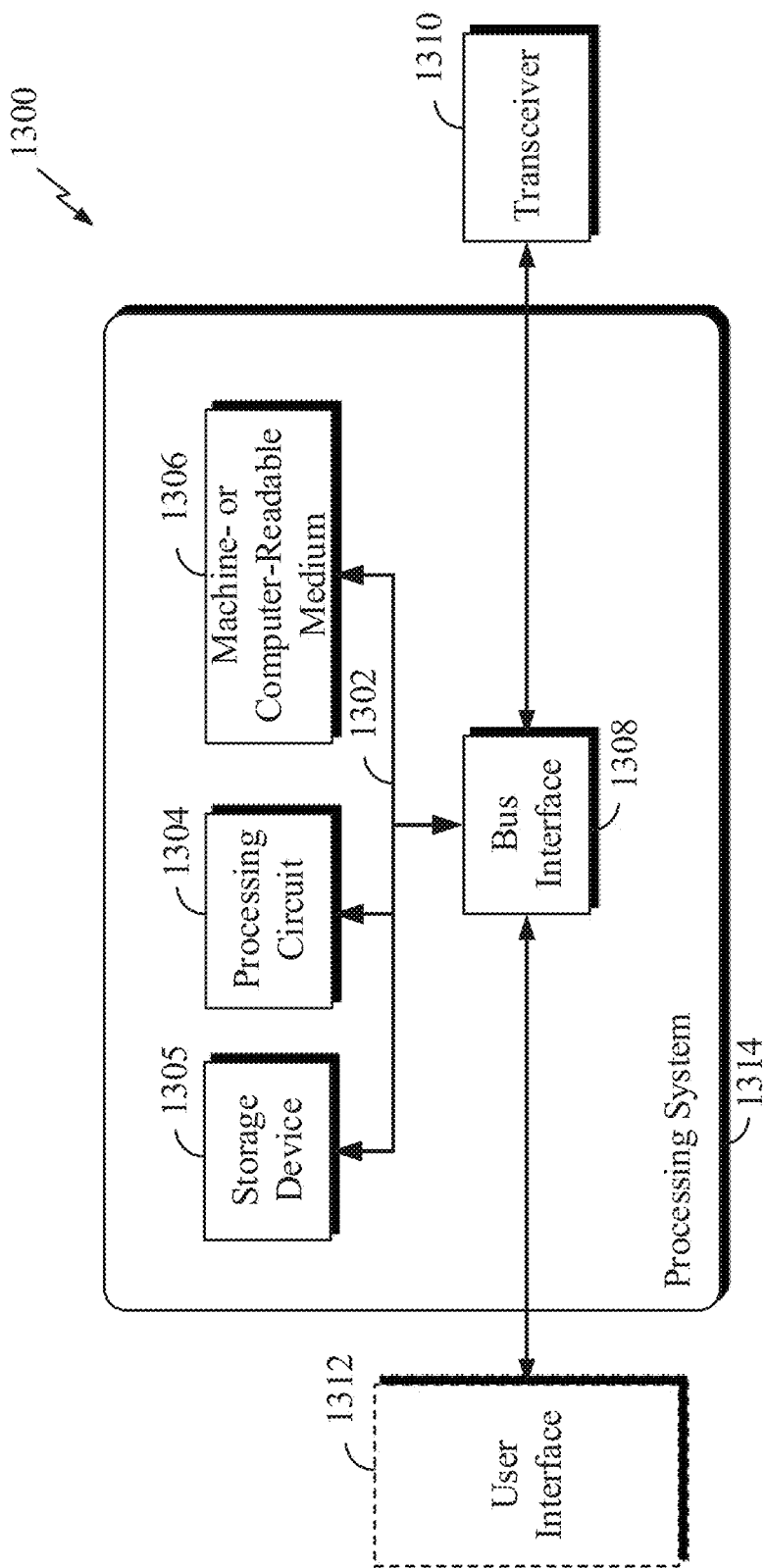
FIG. 13 is a block diagram illustrating an example of a hardware implementation for an apparatus employing a processing system that may exploit the systems and methods of FIGS. 6-12 in accordance with an aspect of the disclosure.

FIG. 13 illustrates an overall system or apparatus 1300 in which the systems, methods and apparatus of FIGS. 1-10 may be implemented. In accordance with various aspects of the disclosure, an element, or any portion of an element, or any combination of elements may be implemented with a processing system 1314 that includes one or more processing circuits 1304. Processing circuits 1304 may include microprocessing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionality described throughout this disclosure. That is, the processing circuit 1304, as utilized in the apparatus 1300, may be used to implement any one or more of the processes described above and illustrated in FIGS. 6-12 such as processes for fast starting a channel application.

In the example of FIG. 13, the processing system 1314 may be implemented with a bus architecture, represented generally by the bus 1302. The bus 1302 may include any number of interconnecting buses and bridges depending on the specific application of the processing system 1314 and the overall design constraints. The bus 1302 links various circuits including one or more processing circuits (represented generally by the processing circuit 1304), the storage device 1305, and a machine-readable, processor-readable, processing circuit-readable or computer-readable media (represented generally by a non-transitory machine-readable medium 1306.) The bus 1302 may also link various other circuits such as timing sources, peripherals, voltage regulators, and power management circuits, which are well known in the art, and therefore, will not be described any further. The bus interface 1308 provides an interface between bus 1302 and a transceiver 1310. The transceiver 1310 provides a means for communicating with various other apparatus over a transmission medium. Depending upon the nature of the apparatus, a user interface 1312 (e.g., keypad, display, speaker, microphone, joystick) may also be provided.

The processing circuit 1304 is responsible for managing the bus 1302 and for general processing, including the execution of software stored on the machine-readable medium 1306. The software, when executed by processing circuit 1304, causes processing system 1314 to perform the various functions described herein for any particular apparatus. Machine-readable medium 1306 may also be used for storing data that is manipulated by processing circuit 1304 when executing software.

One or more processing circuits 1304 in the processing system may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

The software may reside on machine-readable medium 1306. The machine-readable medium 1306 may be a non-transitory machine-readable medium. A non-transitory processing circuit-readable, machine-readable or computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, and any other suitable medium for storing software and/or instructions that may be accessed and read by a machine or computer. The terms "machine-readable medium", "computer-readable medium", "processing circuit-readable medium" and/or "processor-readable medium" may include, but are not limited to, non-transitory media such as portable or fixed storage devices, optical storage devices, and various other media capable of storing, containing or carrying instruction(s) and/or data. Thus, the various methods described herein may be fully or partially implemented by instructions and/or data that may be stored in a "machine-readable medium," "computer-readable medium," "processing circuit-readable medium" and/or "processor-readable medium" and executed by one or more processing circuits, machines and/or devices. The machine-readable medium may also include, by way of example, a carrier wave, a transmission line, and any other suitable medium for transmitting software and/or instructions that may be accessed and read by a computer.

The machine-readable medium 1306 may reside in the processing system 1314, external to the processing system 1314, or distributed across multiple entities including the processing system 1314. The machine-readable medium 1306 may be embodied in a computer program product. By way of example, a computer program product may include a machine-readable medium in packaging materials. Those skilled in the art will recognize how best to implement the described functionality presented throughout this disclosure depending on the particular application and the overall design constraints imposed on the overall system. For example, the machine-readable storage medium 1306 may have one or more instructions which when executed by the processing circuit 1304 causes the processing circuit to: receive, from an application, a request to access the input data; determine a coordinate of the input data; determine a status of the requesting application; and grant the request for access to the input data based on the determined coordinate and the status of the requesting application.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

The various illustrative logical blocks, modules, circuits, elements, and/or components described in connection with the examples disclosed herein may be implemented or performed with a general purpose processing circuit, a digital signal processing circuit (DSP), an application specific integrated circuit (ASIC), a field programmable gate array (FPGA) or other programmable logic component, discrete gate or transistor logic, discrete hardware components, or any combination thereof designed to perform the functions described herein. A general purpose processing circuit may be a microprocessing circuit, but in the alternative, the processing circuit may be any conventional processing circuit, controller, microcontroller, or state machine. A processing circuit may also be implemented as a combination of computing components, e.g., a combination of a DSP and a microprocessing circuit, a number of microprocessing circuits, one or more microprocessing circuits in conjunction with a DSP core, or any other such configuration.

Note that the aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Figure 14:
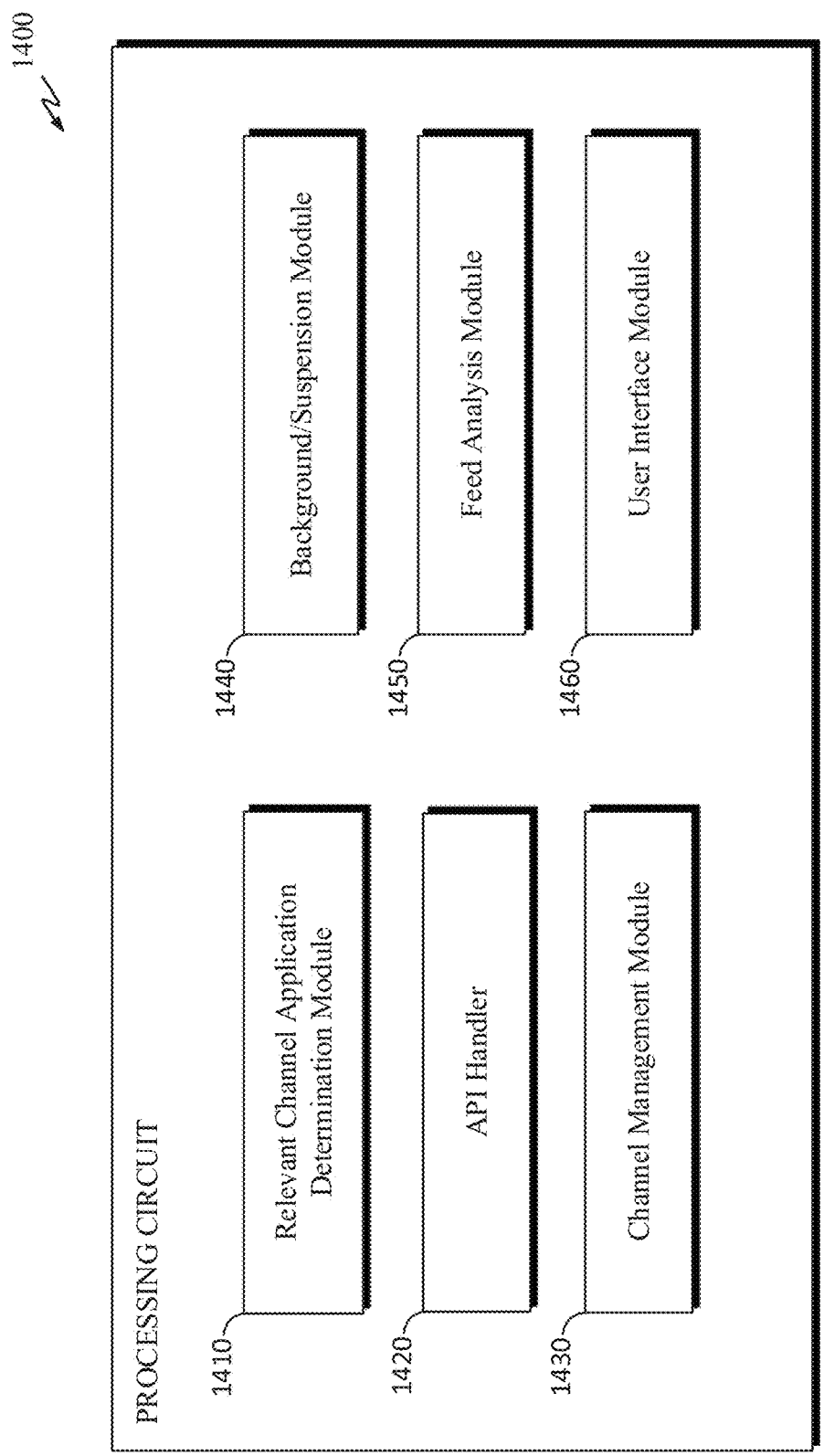
FIG. 14 is a block diagram of exemplary software modules implemented by one or more aspects of the disclosure.

FIG. 14 illustrates an exemplary processing circuit 1400 configured to implement various aspects of the present disclosure. Processing circuit 1400 includes a relevant channel application determination module 1410, an API handler module 420, a channel application management module 1430, a background/suspension module 1440, a feed items analysis module 1450, and a user interface module 1460. One or more of modules 1410-1460 contain instructions and algorithms to execute processes 600-1200 of FIGS. 6-12. Additionally, one or more of modules 1410-1460 may contain instructions to generate notification UI 400, and search UI 500. Additionally, processing circuit 1400 may include one or more functions of processing circuit 1304.

Although not shown, processing circuit 1400 may include a memory device (not shown) that is readable by processing circuit 1400. In one aspect, the memory device may be an on-chip memory device that contains all instructions for each of modules 1410-1460 that enable processing circuit 1400 to execute processes 600-1200 and to render user interfaces 400 and 500.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications are possible. Those skilled, in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

The invention claimed is:

1. A method for fast starting an application in an operating system, the method comprising:
   starting a plurality of channel applications during a boot up sequence of the operating system;
   placing a first channel application of the plurality of channel applications into a suspend mode after an initial time has passed, wherein the initial time allows the plurality of channel applications to finish the boot up sequence and load resources;
   adding the first channel application to a suspended list of channel applications that have booted up, wherein a second channel application of the plurality of channel applications is not on the suspended list;
   receiving an application programming interface (API) call from the first channel application on the suspended list;
   preventing, by a processor, the API call from being executed based upon a determination that the first channel application from which the API call is received is on the suspended list, such that processing resources associated with an execution of the API call are made available for processing functions other than executing the API call from the first channel application on the suspended list based upon the prevention of the execution;
   incrementing a block count indicating a number of times that the API call to the processor is determined to be received from the first channel application while on the suspended list;
   terminating the first channel application based on the block count exceeding a certain level, wherein the terminating includes removing the first channel application from the suspended list;
   receiving a search term;
   identifying a group of channels based on the search term;
   determining that a particular channel from the group of channels is associated with the second channel application that is not on the suspended list; and
   starting the second channel application associated with the particular channel in a background mode prior to receiving a selection of the particular channel from a user.

2. The method of claim 1, further comprising:
   receiving a command to view a list of channels associated with the plurality of channel applications, wherein the suspended list includes one or more most frequently used channel applications associated with channels from the list of channels; and
   removing a particular one of the most frequently used channel applications from the suspended list in response to the received command to view the list of channels.

3. The method of claim 2, further comprising:
   sending a resume instruction to the particular channel application, wherein the particular channel application is on the suspended list; and
   switching the particular channel application from the suspended list to a foreground application in response to receiving a user command to run the particular channel application.

4. The method of claim 2, further comprising:
   re-adding the removed particular channel application to the suspended list in response to receiving a command not pertaining to the removed particular channel application.

5. The method of claim 1, wherein the starting comprises:
   starting one or more of the plurality of channel applications in a background mode;
   loading, in the background mode, resources to execute a particular one of the one or more channel applications; and
   adding the particular channel application to the suspended list, wherein the loading of resources enables subsequent fast starting of the particular channel application from the suspended list relative to a starting of the particular channel application from a cold boot operation in which such resources are not loaded in the background mode.

6. The method of claim 1, wherein the determining that the particular channel is associated with the second channel application that is not on the suspended list comprises:
   determining that the user has a subscription to the particular channel.

7. The method of claim 1, further comprising:
   displaying a plurality of feeds on a notification area of a display screen;
   determining one or more channel applications relevant to the plurality of feeds;
   determining that at least one of the channel applications relevant to the plurality of feeds is on the suspended list; and
   removing the determined at least one relevant channel application from the suspended list.

8. The method of claim 7, further comprising:
   determining that a particular one of the plurality of feeds is rolled off and no longer displayed in the notification area, wherein the particular one feed corresponds to a particular one of the channel applications; and
   terminating the particular one of the channel applications based on the determination that the particular one feed is no longer displayed in the notification area.

9. The method of claim 7, further comprising:
   loading resources and performing an update on at least one of the channel applications associated with at least one of the relevant channel applications while at least one channel application is operating in the background mode; and
   adding the at least one channel application to the suspended list based on a determination that the resources have been loaded and the update completed.

10. The method of claim 1, wherein the first channel application started in the suspend mode during the boot up sequence of the operating system is one of a plurality of are most frequently used channel applications.

11. The method of claim 1, further comprising:
    determining that no user selection is received of the particular channel; and
    terminating the second channel application associated with the particular channel based upon the determination that no user selection for the particular channel was received.

12. A non-transitory processor-readable medium having one or more instructions operational on a client device, wherein the processor executing the instructions performs operations comprising:
    starting a plurality of channel applications during a boot up sequence of the operating system;

placing a first channel application of the plurality of channel applications into a suspend mode after an initial time has passed, wherein the initial time allows the plurality of channel applications to finish the boot up sequence and load resources;

adding the first channel application to a suspended list of channel applications that have booted up, wherein a second channel application of the plurality of channel applications is not on the suspended list;

receiving an application programming interface (API) call from the first channel application on the suspended list;

preventing the API call from being executed based upon a determination that the first channel application from which the API call is received is on the suspended list, such that processing resources associated with an execution of the API call are made available for processing functions other than executing the API call from the first channel application on the suspended list based upon the prevention of the execution;

incrementing a block count indicating a number of times that the API call to the processor is determined to be received from the first channel application while on the suspended list;

terminating the first channel application based on the block count exceeding a certain level, wherein the terminating includes removing the first channel application from the suspended list;

receiving a search term;

identifying a group of channels based on the search term;

determining that a particular channel from the group of channels is associated with the second channel application that is not on the suspended list; and starting the second channel application associated with the particular channel in a background mode prior to receiving a selection of the particular channel from a user.

13. The non-transitory processor-readable medium of claim 10, wherein the operations further comprise:

receiving a command to view a list of channels associated with the plurality of channel applications, wherein the suspended list includes one or more most frequently used channel applications associated with channels from the list of channels; and removing a particular one of the most frequently used channel applications from the suspended list in response to the received command to view the list of channels.

14. The non-transitory processor-readable medium of claim 13, wherein the operations further comprise:

sending a resume instruction to the particular channel application, wherein the particular channel application is on the suspended list; and switching the particular channel application from the suspended list to a foreground application in response to receiving a user command to run the particular channel application.

15. The non-transitory processor-readable medium of claim 12, wherein the operations further comprise:

determining that the user has a subscription to the particular channel.

16. The non-transitory processor-readable medium of claim 12, wherein the operations further comprise:

displaying a plurality of feeds on a notification area of a display screen;

determining one or more channel applications relevant to the plurality of feeds;

determining that at least one of the channel applications relevant to the plurality of feeds is on the suspended list; and removing the determined at least one relevant channel application from the suspended list.

17. The non-transitory processor-readable medium of claim 16, wherein the operations further comprise:

determining that a particular one of the plurality of feeds is rolled off and no longer displayed in the notification area, wherein the particular one feed corresponds to a particular one of the channel applications; and terminating the particular one of the channel applications based on the determination that the particular one feed is no longer displayed in the notification area.

18. The non-transitory processor-readable medium of claim 12, wherein the operations further comprise:

terminating an application in the suspended list after a predetermined continuous time.

19. A system for streaming television content comprising:

a user device having a memory; and at least one processor coupled to the memory and configured to:

start a plurality of channel applications during a boot up sequence of an operating system;

place a first channel application of the plurality of channel applications into a suspend mode after an initial time has passed, wherein the initial time allows the plurality of channel applications to finish the boot up sequence and load resources;

add the first channel application to a suspended list of channel applications that have booted up, wherein a second channel application of the plurality of channel applications is not on the suspended list;

receiving an application programming interface (API) call from the first channel application on the suspended list;

prevent, by the at least one processor, the API call from being executed based upon a determination that the first channel application from which the API call is received is on the suspended list, such that processing resources associated with an execution of the API call are made available for processing functions other than executing the API call from the first channel application on the suspended list based upon the prevention of the execution;

increment a block count indicating a number of times that the API call to the at least one processor is determined to be received from the first channel application while on the suspended list;

terminate the first channel application based on the block count exceeding a certain level, wherein the terminating includes removing the first channel application from the suspended list;

receive a search term;

identify a group of channels based on the search term;

determine that a particular channel from the group of channels is associated with the second channel application that is not on the suspended list; and start the second channel application associated with the particular channel in a background mode prior to receiving a selection of the particular channel from a user.

20. The system of claim 19, the at least one processor further configured to:

display a plurality of feeds on a notification area of a display screen;

determine one or more channel applications relevant to the plurality of feeds;

determine that at least one of the channel applications relevant to the plurality of feeds is on the suspended list; and remove the determined at least one relevant channel application from the suspended list.

* * * * *